June 24, 1924.
A. G. PAINTER
1,498,854
DEMOUNTABLE RIM
Filed July 24, 1922
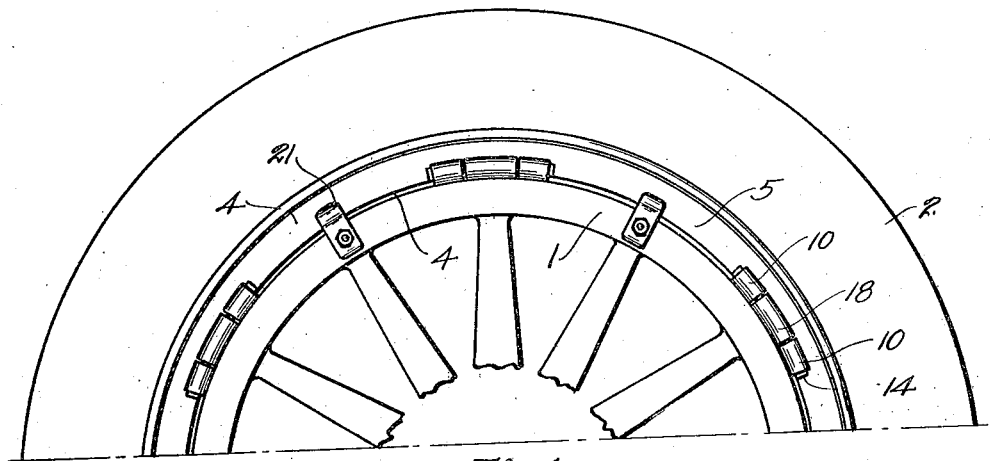
Fig. 1
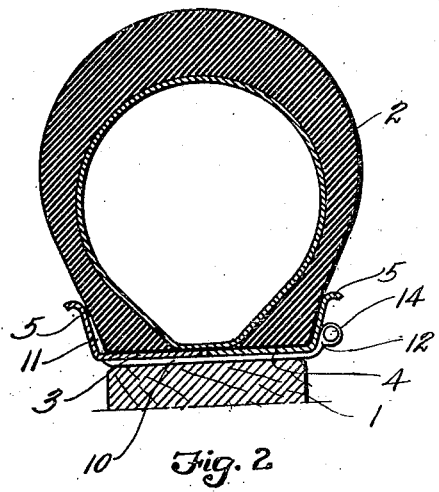
Fig. 2
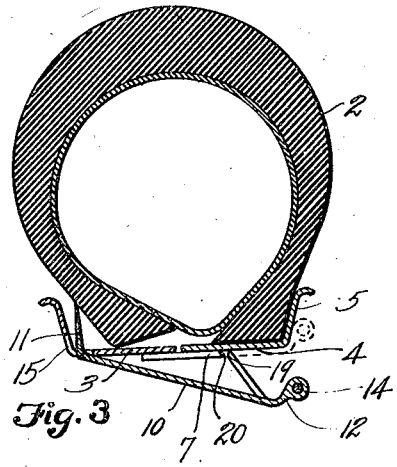
Fig. 3
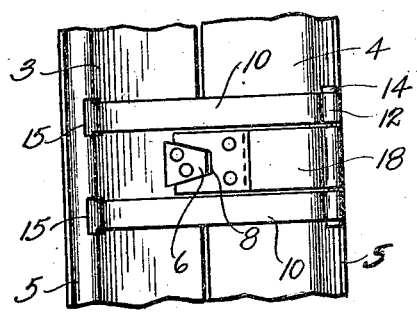
Fig. 4
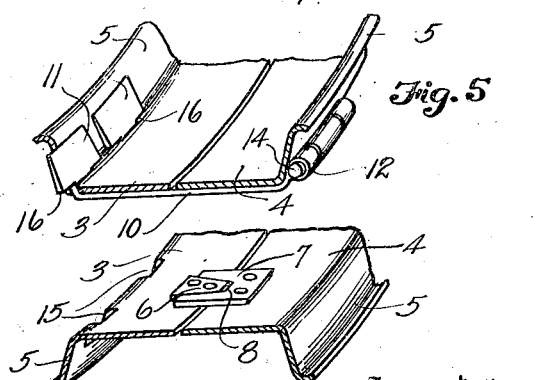
Fig. 5
Fig. 6
Inventor
ARTHUR G. PAINTER
By Attorney
Richard J. Cook Patented June 24, 1924.

1,498,854

UNITED STATES PATENT OFFICE.

ARTHUR G. PAINTER, OF SEATTLE, WASHINGTON, ASSIGNOR OF ONE-HALF TO HENRY C. PETERS, OF SEATTLE, WASHINGTON.

DEMOUNTABLE RIM.

Application filed July 24, 1922. Serial No. 577,066.

*To all whom it may concern:*

Be it known that I, ARTHUR G. PAINTER, a citizen of the United States, and a resident of Seattle, county of King, and State of Washington, have invented certain new and useful Improvements in Demountable Rims, of which the following is a specification.

My invention relates to improvements in automobile wheel construction, and more particularly to demountable rims for use on wheels for automobiles, trucks and similar vehicles which utilize pneumatic tires.

It is the principal object of this invention to provide a rim construction which will greatly facilitate the removal of or the mounting of a tire upon a wheel.

A further object of the invention is to provide a demountable rim, comprising two complemental side sections upon which a tire may be mounted, and which are adapted to be fitted together and against opposite sides of the tire, and to be disconnectably fastened together to retain the tire functionally on the rim.

Another object of the invention resides in the provision of means whereby the rim sections will be retained against movement circumferentially with respect to each other and in the provision of means for locking the sections together to prevent their spreading apart when the tire is inflated.

A still further object of the invention resides in the details of construction and combination of parts embodied in the invention and in the method of applying the parts to and in removing them from a wheel.

In accomplishing these objects, I have provided the improved details of construction, the preferred forms of which are illustrated in the accompanying drawings, wherein—

Figure 1 is a partial, side view of a vehicle wheel having a tire mounted thereon by means of a demountable rim constructed in accordance with the present invention.

Figure 2 is a transverse, sectional view through the tire and rim, particularly illustrating the means for locking the sections of the rim together.

Figure 3 is a similar view, illustrating the movement of the locking members for the purpose of disconnecting the rim sections.

Figure 4 is a plan view of a part of the rim and one set of locking devices, whereby the rim sections are held together.

Figure 5 is a perspective view of a part of the rim, with the locking members applied thereto.

Figure 6 is a perspective view of a part of the rim, showing the interlocking members whereby the rim sections are prevented from slipping circumferentially with respect to each other.

Referring more in detail to the drawings—

1 designates what may be the felloe of a wheel, such as is ordinarily used on automobiles, or trucks, and 2 designates a pneumatic tire casing which is mounted on the wheel by means of a demountable rim construction embodied by the present invention.

The rim comprises two complemental, ring-like sections 3 and 4 that may be fitted together upon the felloe, and each is provided with an out-turned, peripheral flange 5 adapted to retain the opposite edges of the tire within the rim, as is illustrated in Figure 2.

Riveted to the inner face of the rim section 3, at regularly spaced apart intervals, are wedge shaped blocks 6, and likewise, fixed to the inner face of the rim section 4 and projecting over the inner edge thereof, are blocks 7 with tapered notches 8 therein which are adapted to receive the blocks 6 when the sections are fitted functionally together on the wheel, so as to prevent any possible slippage of the sections circumferentially with respect to each other.

To secure or lock the sections 3 and 4 functionally together, I have provided a plurality of sets of locking devices, each comprising two metal clips 10 adapted to transversely underlie the rim sections and which have laterally turned end portions 11 conforming in shape to the inner face of the flange of the rim section 3, and which have slightly upturned opposite end portions 12 provided with apertures for receiving a hinge pin 14 therethrough. These clips are extended through slots 15 located in the rim section 3 adjacent the flange, so that the end portions may seat against the inner face of the flange, and these are enlarged so as to provide shoulders 16 which will engage with the inner surface of the rim section at the ends of the slots to prevent disconnection of the clips therefrom. The end portions 11 are also tapered toward their ends to a thin edge so that they will not cause wearing on the tire.

Mounted on the hinge pins 14 between the clips, are clamping plates 18, each of which has a beveled inner end 19 adapted to pivotally seat against an inwardly beveled edge 20 on the blocks 7 to retain the parts securely together when the tire is inflated.

When the parts are assembled they may be locked on the wheel by clips 21 as shown in Figure 1, or in any other suitable manner.

With the parts so constructed and assembled, it will be noted that the pivot points of the inner ends of the members 18 lie within the dead center lines drawn through the pivot connections of the outer ends of the clips and the hinge pins. This provides that pressure, which would tend to spread the rim sections apart, will cause a tighter clamping of the parts together.

To remove the tire, the rim is first removed from the wheel and then, by pressing downwardly (see Figure 3) on the hinged pin ends of the clips, the parts will be loosened and can then be separated.

It is apparent also that so long as the rim is mounted upon the wheel, the clasps cannot be disconnected and it would be impossible for the tire to be removed.

It is further apparent that any desired number of clasps could be used and that various changes could be made in the construction of the parts without departing from the spirit of the invention.

Having thus described my invention, what I claim as new therein and desire to secure by Letters Patent, is:

1. A demountable rim, comprising two complemental, flanged sections for engaging a tire from opposite sides; one of said sections having slots therein adjacent the flange, blocks fixed to the sections adapted to interlock to prevent relative circumferential slippage thereof, a plurality of clasps for retaining the sections together; each clasp comprising two clips adapted to underlie the rim with ends extended through the slots and having enlarged shoulder portions engageable with the rim to retain the clips within the slots, a hinge pin extended between the outer ends of the clips and a clamping plate pivotally mounted on the hinge pin adapted to pivotally engage with a block on the unslotted rim section to thereby retain the sections in functional relation.

2. A demountable rim of the class described, comprising two complemental, flanged sections for engaging a tire from opposite sides; one of said sections having slots therein adjacent the flange, blocks secured to the other section on the inner face thereof having inwardly beveled edges, a plurality of clasps for retaining the sections together; each clasp comprising a pair of clips having laterally turned ends extended through the slots in the rim section and having enlarged ends disposed within the rim against the flange and retained by said enlarged ends within the slots; the opposite ends of the clips being turned laterally to lie adjacent the flange of the opposite section and having a hinge pin extended between them with a clamping plate pivotally mounted on said pin, having a beveled edge pivotally seated against the beveled edge of a block whereby the sections are retained functionally together.

Signed at Seattle, Washington this 17th day of July 1922.

ARTHUR G. PAINTER.